(12) United States Patent
Hammer-Olsen et al.

(10) Patent No.: US 6,322,690 B1
(45) Date of Patent: Nov. 27, 2001

(54) CHEMICAL METHOD

(75) Inventors: Roy Hammer-Olsen, Ljungaverk (SE); John Sokol, Marietta, GA (US); Göran Sundström, Sundsvall; Johan Sundqvist, Bollnäs, both of (SE)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/715,102

(22) Filed: Nov. 20, 2000

Related U.S. Application Data

(63) Continuation-in-part of application No. 09/450,128, filed on Nov. 26, 1999, now abandoned.

(51) Int. Cl.⁷ .................................. C25B 1/30; C25B 1/24
(52) U.S. Cl. ........................................... 205/466; 205/556
(58) Field of Search ...................................... 205/466, 556

(56) References Cited

U.S. PATENT DOCUMENTS 5,702,585 * 12/1997 Hillrichs et al. ..................... 205/468

* cited by examiner

Primary Examiner—Arun S. Phasge
(74) Attorney, Agent, or Firm—David J. Serbin

(57) ABSTRACT

The invention relates to a process for production of an alkaline hydrogen peroxide solution and an acidified alkali metal salt solution containing chlorate in an electrochemical cell including an anode compartment provided with an anode and a cathode compartment provided with an oxygen reducing cathode. In the cathode compartment an aqueous alkali metal hydroxide and hydrogen peroxide is formed, wherein the molar ratio $MOH:H_2O_2$ for the net production thereof is maintained from about 0.1:1 to about 2:1. Also a process for simultaneous production of chlorine dioxide is disclosed.

13 Claims, 2 Drawing Sheets

CHEMICAL METHOD

This is a continuation-in-part of prior pending application Ser. No. 09/450,128, filed Nov. 26, 1999 now abandoned.

FIELD OF THE INVENTION

The present invention relates to a process for producing hydrogen peroxide in an electrochemical cell by cathodic reduction of oxygen. The invention further relates to production of chlorine dioxide.

BACKGROUND OF THE INVENTION

Alkaline solutions of hydrogen peroxide are commonly used for bleaching and/or delignification of cellulose pulp. The hydrogen peroxide is normally produced according to the anthraquinone process in large plants and transported to the pulp mills. The anthraquinone process is very effective, but requires high investments and is not suitable for small scale on-site production.

Electrochemical production of alkaline hydrogen peroxide solutions is disclosed in U.S. Pat. No. 5,702,585, "Process for the production of mixtures of caustic soda and hydrogen peroxide via the reduction of oxygen", P. C. Foller et al, Journal of Applied Electrochemistry, 25 (1995), p. 613–627 and in C. Oloman, "Electrochemical Processing for the Pulp and Paper Industry", The Electrochemical Consultancy 1996 p. 143–152. However, none of the documents disclose a process that is flexible to obtain various ratios $NaOH^-:H_2O_2$ in combination with production of one or more other chemicals that can be used at pulp mills.

Also chlorine dioxide is a commonly used bleaching agent at pulp mills. Due to the chemical instability of chlorine dioxide it is always produced on-site and many different processes are used commercially, such as those described in U.S. Pat. Nos. 5,770,171, 5,091,166, 5,091,167 and EP 612686. Most of the commercial processes involve reaction of sodium chlorate with a mineral acid, normally sulfuric acid, and a reducing agent, such as chloride ions, sulfur dioxide, methanol or hydrogen peroxide, in an acidic reaction medium. Sodium sulphate is normally obtained as a by-product, either as an acid or neutral solid salt cake or in the form of an acidic residual solution. In many modern pulp mills the sulphate by-product is considered as a useless waste material that has to be disposed, although there still is a demand for some of the sulphate for make up of the cooking liquor.

The formation of sulphate by-product can be decreased or completely avoided by replacing part of or all the sodium chlorate with chloric acid, as described in WO 93/25470. It is also possible to electrochemically acidify the solid sodium sulphate obtained, as described in U.S. Pat. No. 5,198,080, or to electrochemically acidify depleted reaction medium, without crystallisation, as described in U.S. Pat. No. 5,487,881. However, none of these methods have so far been commercialised.

SUMMARY OF THE INVENTION

It is an object of the invention to provide an electrochemical process for producing alkaline hydrogen peroxide solutions that can be used in a great variety of bleaching processes, such as bleaching and/or delignification of cellulose pulp, particularly in ECF (elemental chlorine free) or TCF (totally chlorine free) sequences, or for brightening of mechanical pulp.

It is another object of the invention to provide an electrochemical process for producing alkaline hydrogen peroxide solutions, in which one or more other chemicals are obtained that can be used at a pulp mill, particularly an acidified chlorate containing solution for use in the production of chlorine dioxide.

It is still another object of the invention to provide an electrochemical process for producing alkaline hydrogen peroxide solutions, in which one or more by-products from chlorine dioxide production can be used as feed materials.

It is still another object to provide a method for production of hydrogen peroxide and chlorine dioxide that awards for flexibility as to the amount of sulphate by-product obtained.

These objects are achieved by the process defined in the appended claims.

GENERAL DESCRIPTION OF THE INVENTION

According to one aspect, the invention concerns a continuous process for production of an alkaline hydrogen peroxide solution and an acidified alkali metal salt solution in an electrochemical cell including an anode compartment provided with an anode and a cathode compartment provided with an oxygen reducing cathode. The process comprises the steps of:

(a) feeding an aqueous alkali metal salt solution containing chlorate to the anode compartment;

(b) reacting at the anode said aqueous alkali metal salt solution to obtain $H^+$ and to form an acidified aqueous alkali metal salt solution in the anode compartment;

(c) transferring $H^+$ and alkali metal ions from the anode compartment to the cathode compartment;

(d) feeding oxygen or oxygen containing fluid and water to the cathode compartment;

(e) reacting at the cathode said oxygen and water to form an alkaline aqueous solution containing hydrogen peroxide ($H_2O_2$) and alkali metal hydroxide (MOH) in the cathode compartment;

(f) withdrawing acidified aqueous alkali metal salt solution formed in the anode compartment; and, (g) withdrawing alkaline aqueous hydrogen peroxide solution formed in the cathode compartment, wherein the molar ratio $MOH:H_2O_2$ for the net production of alkali metal hydroxide and hydrogen peroxide in the cathode compartment in step (e) is maintained from about 0.1:1 to about 2:1, suitably from about 0.1:1 to about 1.8:1, preferably from about 0.1:1 to about 1.7:1, most preferably from about 0.5:1 to about 1.7:1. M refers to alkali metals such as sodium, potassium or mixtures thereof, among which sodium is most preferred.

The terms anode compartment and cathode compartment as used herein also include optional recirculation loops for anolyte and catholyte. The anode- and cathode compartments are suitably separated by at least one barrier, such as a membrane or a diaphragm, permeable for $H^+$ and alkali metal ions, but preferably not for anions such as hydroxide- and perhydroxyl ions. The barrier is preferably at least one ion-exchange membrane, most preferably at least one cation-exchange membrane. Standard polymeric ion-exchange membranes are preferred, but also high ion conducting membranes such as ceramic membranes can be useful. In most cases a two compartment cell is used, but also cells comprising one of more compartments between the anode- and cathode compartments may come into consideration.

Any oxygen reducing cathode can be used, although it is preferably made of carbon, such graphite or carbon black, optionally with other materials incorporated, like inert chemically resistant polymers (e.g. PTFE) or catalytically active materials (e.g. gold, zinc or the like), the latter suitably being employed as a partial coating on the carbon. Due to the low solubility of oxygen in the catholyte a three dimensional electrode is preferred as a cathode. One group of three dimensional electrodes include fixed beds with large porosity, for example reticulate (e.g. Reticulated Vitreous Carbon), particulate or felt (e.g. graphite felt) beds, or beds of non-woven fibres (e.g. carbon fibres), which all are commercially available. These kinds of fixed beds may be designed as a trickle-bed cathode. Another group of three dimensional electrodes are micro-porous, optionally layered, gas diffusion electrodes, which may, for example, be made of porous carbon. Such gas diffusion electrode are commercially available and are similar to those used in, e.g. fuel cells.

For the anode, any standard type of electrodes can be used, such as titanium coated with precious metal oxides, e.g. DSA $O_2$™, or gas electrodes like polarised hydrogen anodes.

The aqueous solution fed to the anode compartment in step (a) is an optionally acidic solution containing alkali metal chlorate, optionally also containing alkali metal sulphate and/or other alkali metal salts. The solution suitably contains from about 0.5 moles/l up to saturation, preferably from about 1 to about 12 moles/l of alkali metal salts. The acidity is preferably from about 0 to about 11 N, most preferably from about 0 to about 9 N. In one preferred embodiment the solution originates directly or indirectly from a chlorine dioxide generator. For example, the alkali metal solution may be depleted acidic reaction medium from a chlorine dioxide generator, optionally further acidified by electrochemical methods, or neutral or acid alkali metal sulphate obtained as a by-product in production of chlorine dioxide. In another preferred embodiment, a solution of preferably substantially neutral alkali metal chlorate is fed to the anode compartment.

At the anode the water in the solution is reacted in step (b) to yield $H^+$ and normally also oxygen. The following reaction is believed to take place:

$$H_2O \rightarrow 2H^+ + \frac{1}{2}O_2 + 2e^-$$

The voltage over the cell brings cations in step (c) to migrate towards the cathode. Thus both alkali metal ions and $H^+$ are transferred from the anode compartment into the cathode compartment. However, the entire amount of $H^+$ produced are not transferred, thus leaving an acidified alkali metal salt product solution in the anode compartment, preferably containing sulphate, chlorate or a mixture thereof.

Oxygen is may be fed to the cathode compartment in step (d) together with a feed of catholyte, suitably at a sufficiently high pressure to at least partly dissolve it in the catholyte, for example from about 100 to about 2000 kPa. A high pressure improves the current density, but also the cost of the cell due to more complicated construction. If a gas diffusion electrode is used as a cathode, the oxygen is preferably fed as a gas, most preferably together with water vapour, to a gas chamber from which it diffuses into the cathode. Some of the oxygen may be derived from the oxygen obtained at the anode in step (b). It is also possible to use oxygen obtained at production of chlorine dioxide with hydrogen peroxide as a reducing agent.

In step (e) water and oxygen are reacted at the cathode to yield perhydroxyl- and hydroxide ions. The following reaction is believed to take place.

$$H_2O + O_2 + 2e^- \rightarrow HO_2^- + OH^-$$

Together with the $H^+$ and the alkali metal ions transferred from the anode compartment, the reaction products will form an aqueous product solution in the cathode compartment containing hydrogen peroxide and alkali metal hydroxide, suitably with a concentration from about 1 to about, 15 wt %, preferably from about 2 to about 10 wt % of hydrogen peroxide and suitably from about 2 to about 20 wt %, preferably from about 4 to about 15 wt % of alkali metal hydroxide. The molar ratio $MOH:H_2O_2$ obtained in the net production of alkali metal hydroxide and hydrogen peroxide depends on the ratio of alkali metal ions to $H^+$ transferred from the anode compartment, which is determined by the corresponding ratio in the anode compartment. By setting the acidity of the alkali metal salt solution obtained in the anode compartment the molar ratio $MOH:H_2O_2$ can thus be controlled. Further, by setting the residence time in the anode compartment the conversion degree and the acidity of the resulting alkali metal solution can be controlled, and thereby also the molar ratio $MOH:H_2O_2$ produced in the cathode compartment. A low molar ratio, i.e. high amounts of hydrogen peroxide makes the solution suitable for a variety of bleaching processes, such as ECF and TCF sequences or brightening of mechanical pulp. On the other hand, this requires a low molar ratio of alkali metal ions to $H^+$ transferred to the cathode compartment, which lowers the current efficiency. It is preferred to operate with a conversion degree of alkali metal ions to $H^+$ in the anode compartment from about 0.05 to about 90%, most preferably from about 0.1 to about 80%, somewhat depending on which alkali metal salts being used. For a sodium chlorate solution the conversion degree is suitably from about 2 to about 80%, preferably from about 7 to about 60%, most preferably from about 7 to about 40%. The current efficiency for the production of alkali metal hydroxide (corresponds to the current efficiency for alkali metal ions transferred from the anode- to the cathode compartment) is preferably from about 3 to about 85% most preferably from 20 to almost 70%.

In steps (f) and (g) the product solutions obtained in the anode- and cathode compartments are simply withdrawn. The acidified alkali metal solution obtained in the anode compartment can then be used as a feed for chlorine dioxide production, while the alkaline hydrogen peroxide solution obtained in the cathode compartment may be used for bleaching and/or delignifying cellulose pulp.

In many cases it can be favourable to connect two or more cells as described above in series. It is then possible to cascade only the anolyte (from step (f) in the first cell to step (a) in the next one), only the catholyte (from step (g) in the first cell to step (d) in the next one), or both the anolyte and the catholyte.

The alkali metal referred to herein is suitably sodium, potassium or mixtures thereof, preferably sodium.

A preferred embodiment of the invention concerns a continuous process for production of hydrogen peroxide and simultaneous production of chlorine dioxide by reduction of chlorate ions in an acidic reaction medium maintained in a reactor comprising the steps:

(i) producing an alkaline hydrogen peroxide solution and an acidified alkali metal salt solution by performing steps (a) through (g) as described above;

(ii) feeding to the reaction medium in the reactor acidified aqueous alkali metal salt solution withdrawn from anode compartment in step (f) above;

(iii) reducing chlorate ions in the reaction medium to yield chlorine dioxide, preferably by means of a reducing agent, most preferably hydrogen peroxide; and, (iv) withdrawing chlorine dioxide from the reactor.

In this embodiment the alkali metal salt solution in step (a) suitably has a concentration from about 0.5 moles/l up to saturation, preferably from about 2 to about 12 moles/l, most preferably from about 3 to about 8 moles/l. If the solution is alkali metal chlorate the acidity preferably is from about 0 to about 5 N, most preferably from about 0 to about 4 N. If the solution is a mixture of sulphate and chlorate, the acidity is suitably from about 0 to about 11 N, preferably from about 0.5 to about 9 N.

It is particularly preferred to feed a substantially neutral alkali metal chlorate solution to the anode compartment in step (a), thereby obtaining a mixture of chloric acid and alkali metal chlorate that is withdrawn in step (f) and fed in step (ii).

The chlorine dioxide can be produced in step (iii) and (iv) according to any known process in which chlorate ions are reduced, by a reducing agent or electrochemically, including those described in the earlier mentioned U.S. Pat. Nos. 5,770,171, 5,091,166, 5,091,167 and WO 93/25470. These preferred processes involve feeding to an acidic reaction medium sulfuric acid, a reducing agent, preferably methanol, hydrogen peroxide or mixtures thereof, and alkali metal chlorate and/or chloric acid. In the reaction medium, preferably maintained at subatmospheric pressure, chlorate ions are reduced to chlorine dioxide, which is withdrawn as a gas, while alkali metal sulphate is formed as a by-product, normally as a solid acidic or neutral salt cake. It is also possible to produce chlorine dioxide in a substantially atmospheric process, as described in EP 612686, or by using other reducing agents, alone or in mixtures, such as chloride ions, sulfur dioxide or organic substances like ethanol, isopropanol, other alcohols and formaldehyde. The acidity of the acidified alkali metal salt solution fed in step (ii) determines the amount of sulfuric acid that has to be fed, and thereby also the amount of sulphate by-product formed. Thus, it is possible to adapt the process to produce the amount of sulphate by-product that is needed at each specific pulp mill.

The net amount of sulphate by-product from the chlorine dioxide generation can also be reduced by using a solution thereof as a feed to the anode compartment in step (a), in combination with alkali metal chlorate. The acidified alkali metal salt solution withdrawn in step (g) and fed in step (ii) will then be a mixture containing alkali metal sulphate, sulfuric acid, alkali metal chlorate and chloric acid. The amount of sulfuric acid added from external sources will then be reduced to an extent depending on the conversion degree in the anode compartment in step (b). Thus, also in this case it is possible to control the net production of sulphate by-product and adapt it to the demand in each specific pulp mill.

In a variation of this embodiment depleted reaction medium from the chlorine dioxide generation in step (iii) is withdrawn from the reactor, preferably substantially without crystallisation of alkali metal salts, and used as a feed to the anode compartment in step (a). This aqueous solution will then suitably contain alkali metal sulphate, alkali metal chlorate and suitably have an acidity from about 0.5 to about 11 N, preferably from about 3 to about 9 N, most preferably from about 3 to about 8. The sulphate concentration is suitably from about 0.5 moles/l up to saturation, preferably from about 1 to about 8 moles/l, most preferably from about 1 to about 6 moles/l, while the chlorate concentration suitably is from about 0.5 moles/l up to saturation, preferably from about 1 to about 5 moles/l, most preferably from about 1 to about 4 moles/l. Preferably the molar ratio $H^+:SO_4^{2-}$ is from about 0.5 to about 1.5, most preferably from about 0.7 to about 1.3. The conversion degree for alkali metal ions to $H^+$ in the anode compartment is preferably from about 0.05 to about 20%, most preferably from about 0.1 to about 10%. The acidified alkali metal solution is then used as a feed in step (ii). It is possible to substantially avoid net production of sulphate by-product. The entire process can be run in the same manner as the process described in the earlier mentioned U.S. Pat. No. 5,487,881, with the exception that the electrochemical acidification step is performed as described above and thus also involves simultaneous production of an alkaline hydrogen peroxide solution.

In still another variation of this embodiment depleted reaction medium from step (iii) is withdrawn from the chlorine dioxide reactor in the same manner and with the same preferred composition as described above. The withdrawn reaction medium is first electrochemically acidified in a cell also producing alkali metal hydroxide, whereupon the acidified reaction medium is further acidified in an electrochemical cell according to step (i), and finally used as a feed in step (ii). Also this variation of the process can be run as described in U.S. Pat. No. 5,487,881, with the exception that the acidification of the depleted reaction medium is carried out in at least two steps, a first step involving co-production of alkali metal hydroxide, and a second step involving co-production of an alkaline hydrogen peroxide solution. The variation can also be described as a continuous process for production of hydrogen peroxide and simultaneous production of chlorine dioxide by reduction of chlorate ions in an acidic reaction medium maintained in a reactor comprising the steps:

(i) producing an alkaline hydrogen peroxide solution and an acidified alkali metal salt solution by performing steps (a) through (g) as described above;

(ii) feeding to the reaction medium in the reactor acidified aqueous alkali metal salt solution withdrawn from anode compartment in step (f) of step (i);

(iii) reducing chlorate ions in the reaction medium to yield chlorine dioxide;

(iv) withdrawing chlorine dioxide from the reactor;

(v) withdrawing depleted reaction medium from the reactor;

(vi) acidifying depleted reaction medium from step (v) in an electrochemical cell under simultaneous production of alkali metal hydroxide; and, (vii) using acidified reaction medium from step (vi) as a feed in step (a) of step (i).

By varying the alkali metal hydroxide production between steps (i) and (vi), the production of pure alkali metal hydroxide and the ratio of alkali metal hydroxide to hydrogen peroxide can be adjusted to meet the specific demand at each individual pulp mill. Also hear it is possible to substantially avoid net production of sulphate by-product.

DETAILED DESCRIPTION OF PREFERRED EMBODIMENTS

Some preferred embodiments will now be described in detail with reference to the drawings.

Figure 1:
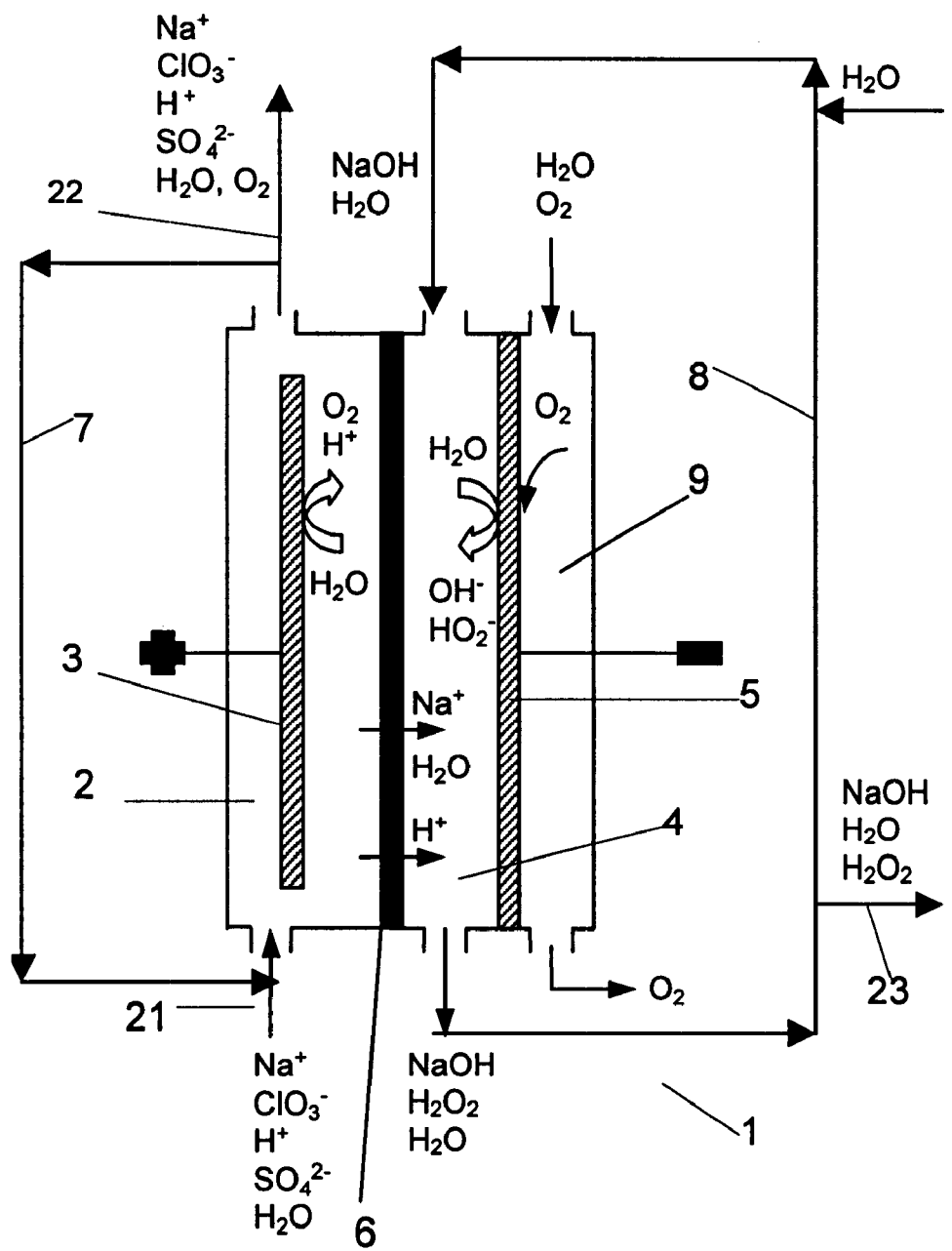
FIG. 1 schematically shows an electrochemical cell for production of acidified alkali metal salt solution and alkaline hydrogen peroxide solution.

FIG. 1 shows a two compartment cell 1 with an anode compartment 2 including a recirculation loop 7 and provided with a DSA™ anode 3, and a cathode compartment 4 including a recirculation loop 8 and provided with an oxygen reducing gas diffusion cathode 5. The compartments 2, 4 are separated by a cation-exchange membrane 6. Adjacent the gas diffusion cathode 5 is a gas chamber 9. If another kind of three dimensional cathode is used, the gas chamber 9 is normally excluded.

In operation, an acidic aqueous solution 21 of sodium sulphate and sodium chlorate, thus containing $Na^+$, $H^+$, $ClO_3^-$, $SO_4^{2-}$ and $H_2O$, is continuously fed to the anode compartment 2. This solution 21 may, for example, be depleted reaction medium from a chlorine dioxide reactor. At the anode 3 $H_2O$ is split to $O_2$ and $H^+$, thus further increasing the acidity of the solution. The voltage over the cell brings some of the $Na^+$ and $H^+$ to migrate from the anode compartment 2, through the membrane 6, into the cathode compartment 4. As a result, the aqueous solution formed in the anode compartment 2 and circulating through the loop 7, i.e. the anolyte, will contain the same components as the feed solution, but with higher content of $H^+$ and lower content of $Na^+$. Part of this solution is withdrawn as a product 22 together with oxygen.

Simultaneously, humid oxygen, i.e. $O_2$ and $H_2O$ in gas form, are continuously fed to the cathode compartment 4, while a catholyte containing $NaOH$, $H_2O_2$ and $H_2O$ are circulating in the loop 8. The gaseous components diffuse into the cathode 5 and react to form $OH^-$ and $HO_2^-$, which combine with the $Na^+$ and $H^+$ transferred from the anode compartment 2 through the membrane 6 and form hydrogen peroxide and sodium hydroxide. Part of the catholyte is withdrawn as a product 23, while make up water is fed to the loop 8.

Operation of a cell with another kind of three dimensional cathode than gas diffusion electrode is performed in a similar way, although the oxygen is not fed to a gas chamber, but to the catholyte in which it at least partially is dissolved. The pressure in the cathode compartment is then preferably from about 100 to about 2000 kPa, while it is preferred to have a slightly higher pressure in the anode compartment as this improves the safety if there would be a leakage over the membrane, and possibly also the current efficiency.

In one mode of operation, the sodium salt solution in the anode compartment 2 has the following composition: 4.2 moles/l of sulphate, 3.5 moles/l of chlorate and an acidity of 5.2 N. Using a gas diffusion cathode 5, without a catalyst, and made of a low to medium surface area carbon, feeding humid oxygen in excess, operating at a current density of about 500 A/m² and keeping the catholyte concentration constant at an alkalinity of 6 wt % NaOH, the net production in the cathode compartment 4 will be a product 23 having a $NaOH:H_2O_2$ molar ratio of about 1.6 and a sodium hydroxide concentration of 6 wt %. The conversion degree from $Na^+$ to $H^+$ will be 1.6% at a supplied current of 270 A min per litre anolyte, while the current efficiency for sodium hydroxide formation will be about 65%.

In another mode of operation, acidifying a neutral sodium chlorate solution substantially free from sulphate, the solution in the anode compartment 2 contains 5 moles/l of chlorate and has an acidity of 0.5 N. Using a gas diffusion cathode 5, without a catalyst, and made of a low to medium surface area carbon, feeding humid oxygen in excess, operating at a current density of about 500 A/m² and keeping the catholyte concentration constant at an alkalinity of 6 wt % NaOH, the net production in the cathode compartment 4 will be a product 23 having a $NaOH:H_2O_2$ molar ratio of 1.4 and a sodium hydroxide concentration of 6 wt %. The conversion degree from $Na^+$ to $H^+$ will be 10%, while the current efficiency for sodium hydroxide formation will be 60%.

Figure 2:
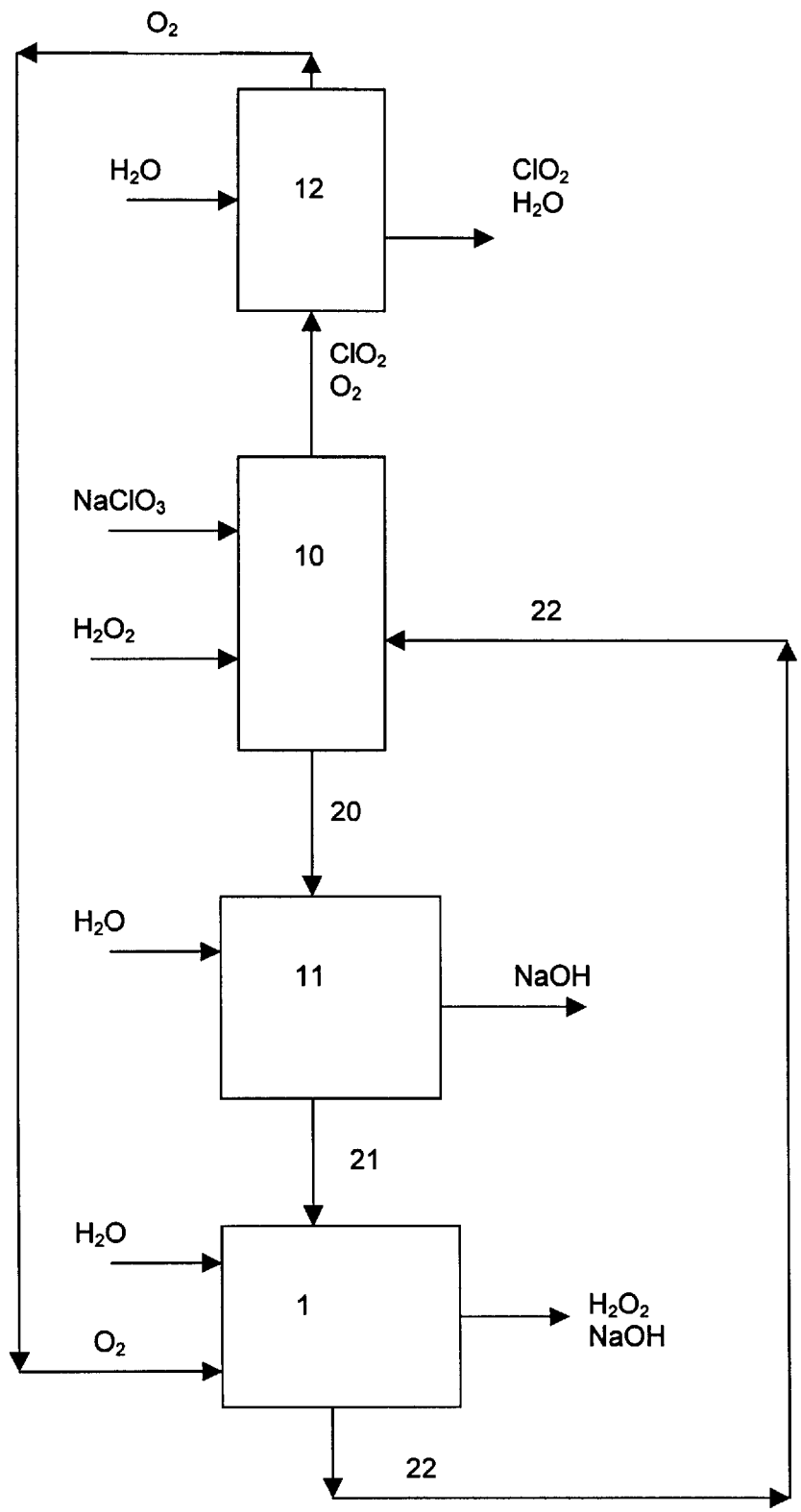
FIG. 2 schematically shows a flow sheet for a process of producing chlorine dioxide, alkali metal hydroxide and alkaline hydrogen peroxide solution.

FIG. 2 shows a variation of a process for simultaneous production of chlorine dioxide, hydrogen peroxide and sodium hydroxide. A chlorine dioxide reactor 10, operating as described in the earlier mentioned U.S. Pat. No. 5,487,881 and holding an aqueous acidic reaction medium containing $Na^+$, $H^+$, $ClO_3^-$ and $SO_4^{2-}$, is continuously fed with $NaClO_3$, $H_2O_2$ and an acidic aqueous solution 22 containing $Na^+$, $H^+$, $ClO_3^-$ and $SO_4^{2-}$. In the reactor 10 $ClO_3^-$ is reacted with $H_2O_2$ and $H^+$ to form $ClO_2$ and $O_2$, which are withdrawn as gases. Depleted reaction medium 20, with substantially the same composition as within the reactor 10, is withdrawn without crystallisation and fed to an electrochemical cell 11, also operating as described in U.S. Pat. No. 5,487,881 and thus producing an acidified solution 21 containing the same components as the feed solution 20, but with higher content of $H^+$ and lower content of $Na^+$. Simultaneously, sodium hydroxide is produced in the cell 11 from water and the sodium ions removed from the feed solution 20. The amount of sodium hydroxide produced increases with the conversion degree for the acidification. In a preferred mode of operation the acidification of the solution 20 to solution 21 is accomplished in the anode compartment of a two compartment cell 11 divided with a cation exchange membrane, while the sodium hydroxide is formed in the cathode compartment. The acidified solution 21 is fed to the anode compartment in a cell 1 as shown in FIG. 1 and operating as described above. The acidified product solution 22 is then recycled to the chlorine dioxide reactor 10, thus eliminating the need for feeding acids from external sources and avoiding the net production of sulphate by-product. The gaseous $ClO_2$ and $O_2$ withdrawn from the reactor 10 are transferred to an absorber 12 in which the $ClO_2$ is absorbed in water while the $O_2$ is transferred to the cell 1 and used in the production of $H_2O_2$ and NaOH. By varying the conversion degree for the acidification between the two cells 11 and 1, the production of sodium hydroxide and hydrogen peroxide can be controlled to fit the demand in each specific case.

The invention will now be described further through the following Example, which however not should be interpreted as limiting its scope. If not otherwise stated, all parts and percentages refer to part and percent by weight.

EXAMPLE

Chloric acid and alkaline hydrogen peroxide were simultaneously produced in a two compartment laboratory cell provided with a Ti/DSA™ anode (240 cm$^2$), an oxygen reducing graphite felt cathode (240 cm$^2$ superficial, 10$^4$ cm$^2$ real) and a Nafion™ 450 cation-exchange membrane. An aqueous solution of sodium chlorate and chloric acid was fed to the anode compartment, while an aqueous solution of sodium hydroxide and oxygen was fed to the cathode compartment. At the anolyte outlet the temperature was about 35–40° C. and the pressure about 240–500 kPa. At the catholyte outlet the temperature was about 40–44° C. and the pressure about 101–450 kPa. For practical reasons, the cell was operated with a single pass of catholyte, while the anolyte leaving the cell was recirculated and partly neutralised with sodium hydroxide before entering the anode compartment again. Samples of anolyte and catholyte were taken at the respective outlets and analysed, and the current efficiency (C.E.) for the hydrogen peroxide formation and the sodium transport over the membrane (corresponds to the sodium hydroxide formation). In the Table below, steady state figures for the different runs appear:

| Anolyte | | | Catholyte | | |
|---|---|---|---|---|---|
| [H$^+$] (M) | [ClO$_3^-$] (M) | C.E. Na$^+$ (%) | [H$_2$O$_2$] (M) | C.E. H$_2$O$_2$ (%) | OH/H$_2$O$_2$ Net. Prod. (mol/mol) |
| 0.98 | 5.65 | 57.5 | 0.58 | 74.2 | 1.55 |
| 0.53 | 6.04 | 68.2 | 0.58 | 71.3 | 1.91 |
| 0.98 | 5.93 | 59.3 | 0.64 | 74.0 | 1.60 |
| 0.50 | 5.17 | 64.8 | 0.56 | 68.8 | 1.90 |
| 0.74 | 5.51 | 62.3 | 0.63 | 80.4 | 1.55 |
| 0.74 | 4.66 | 56.2 | 0.63 | 78.9 | 1.42 |
| 0.53 | 4.54 | 65.0 | 0.64 | 81.1 | 1.60 |
| 1.02 | 4.56 | 50.1 | 0.61 | 78.0 | 1.28 |
| 0.76 | 5.46 | 61.2 | 0.67 | 81.9 | 1.49 |
| 0.48 | 5.01 | 68.2 | 0.66 | 80.6 | 1.70 |
| 0.51 | 5.03 | 66.1 | 0.70 | 84.8 | 1.56 |
| 1.00 | 4.98 | 55.1 | 0.65 | 78.7 | 1.40 |
| 0.52 | 4.97 | 68.7 | 0.61 | 92.6 | 1.52 |
| 0.50 | 4.95 | 66.3 | 0.79 | 82.4 | 1.61 |
| 1.01 | 5.12 | 52.9 | 0.63 | 67.2 | 1.59 |
| 0.51 | 4.59 | 65.1 | 0.62 | 77.5 | 1.68 |

What is claimed is:

1. A continuous process for production of an alkaline hydrogen peroxide solution and an acidified alkali metal salt solution in an electrochemical cell including an anode compartment provided with an anode and a cathode compartment provided with an oxygen reducing cathode, the process comprising the steps of:
   (a) feeding an aqueous alkali metal salt solution containing alkali metal chlorate to the anode compartment;
   (b) reacting at the anode said aqueous alkali metal salt solution to obtain H$^+$ and to form an acidified aqueous alkali metal salt solution in the anode compartment;
   (c) transferring H$^+$ and alkali metal ions from the anode compartment to the cathode compartment;
   (d) feeding oxygen or oxygen containing fluid and water to the cathode compartment;
   (e) reacting at the cathode said oxygen and water to form an alkaline aqueous solution containing hydrogen peroxide (H$_2$O$_2$) and alkali metal hydroxide (MOH) in the cathode compartment;
   (f) withdrawing acidified aqueous alkali metal salt solution formed in the anode compartment; and,
   (g) withdrawing alkaline aqueous hydrogen peroxide solution formed in the cathode compartment, wherein the molar ratio MOH:H$_2$O$_2$ in the aqueous solution formed in the cathode compartment in step (e) is maintained from about 0.1:1 to about 2:1.

2. A continuous process for production of hydrogen peroxide and simultaneous production of chlorine dioxide by reduction of chlorate ions in an acidic reaction medium maintained in a reactor comprising the steps;
   (i) producing an alkaline hydrogen peroxide solution and an acidified alkali metal salt solution by performing steps (a) through (g) according to claim 1;
   (ii) feeding to the reaction medium in the reactor acidified aqueous alkali metal salt solution withdrawn from the anode compartment in step (f) of step (i);
   (iii) reducing chlorate ions in the reaction medium to yield chlorine dioxide;

(iv) withdrawing chlorine dioxide from the reactor.

3. A process as claimed in claim 2, wherein the reduction of chlorate ions in stop (iii) is accomplished by means of a reducing agent.

4. A process as claimed in claim 3, wherein the reducing agent is hydrogen peroxide.

5. A continuous process for production of hydrogen peroxide and simultaneous production of chlorine dioxide by reduction of chlorate ions in an acidic reaction medium maintained in a reactor comprising the steps of:

(i) Producing an alkaline hydrogen peroxide solution and an acidified alkali metal salt solution by performing steps (a) through (g) according to claim 1;

(ii) feeding to the reaction medium in the reactor acidified aqueous alkali metal salt solution withdrawn from ther anode compartment in step (f) of step (i);

(iii) reducing chlorate ions in the reaction medium to yield chlorine dioxide;

(iv) withdrawing chlorine dioxide from the reactor;

(v) withdrawing depleted reaction medium from the reactor;

(vi) acidifying depleted reaction medium from step (v) in an electrochemical cell under simultaneous production of alkali metal hydroxide; and, (vii) using acidified reaction medium from step (vi) as a feed in step (a) of step (i).

6. A process as claimed in claim 1, wherein the molar ratio $MOH:H_2O_2$ for the net production of alkali metal hydroxide and hydrogen peroxide in the cathode compartment in step (e) is maintained from about 0.5:1 to about 1.7:1.

7. A process as claimed in claim 1, wherein the alkali metal salt solution fed to the anode compartment in step (a) also contains alkali metal sulphate.

8. A process a claimed is claim 1, wherein the molar ratio $MOH:H_2O_2$ for the net production of alkali metal hydroxide and hydrogen peroxide in the cathode compartment in step (e) is controlled by setting the acidity of the alkali metal salt solution obtained in the anode compartment.

9. A process as claimed in claim 8, wherein the molar ratio $MOH:H_2O_2$ for the net production of alkali metal hydroxide and hydrogen peroxide in the cathode compartment in step (e) is controlled by setting the residence time in the anode compartment.

10. A process as claimed in claim 1, wherein the process is operated with a conversion degree of alkali metal ions to $H^+$ in the anode compartment from about 0.05 to about 90%.

11. A process as claimed in claim 1, wherein the process is operated at a current efficiency for the production of alkali metal hydroxide from about 3 to about 85%.

12. A process as claimed in claim 1, wherein the acidified alkali metal solution obtained in the anode compartment and withdrawn in step (f) is used as a feed for chlorine dioxide production.

13. A process as claimed in claim 1, wherein the anode compartment and the cathode compartment in the cell are separated by means of a cation-exchange membrane.

* * * * *